United States Patent Office

3,713,801
Patented Jan. 30, 1973

3,713,801
NITROGEN-PHOSPHATE FERTILIZERS AND THEIR MANUFACTURE
Dahlia S. Greidinger, Haifa, and Liuba Cohen, Kiriat Motzkin, Israel, assignors to Chemicals & Phosphates Ltd., Haifa, Israel
No Drawing. Filed July 27, 1970, Ser. No. 58,665
Claims priority, application Israel, Aug. 15, 1969, 32,831/69
Int. Cl. C05b 15/00
U.S. Cl. 71—29                                    4 Claims

ABSTRACT OF THE DISCLOSURE

The presence of biuret in nitrogen-phosphate fertilizers which has hitherto been practically unavoidable, is undesirable since biuret is phytotoxic even at low concentrations. The invention provides prilled or flaked nitrogen-phosphate fertilizers virtually free of biuret, in which the ratio N:$P_2O_5$ is not substantially larger than 3:1, which are manufactured by prilling or flaking a melted mixture of urea and anhydrous phosphoric acid in the desired molar ratio.

---

This invention has the object to provide an improved nitrogen-phosphate fertilizer (herein N-P fertilizer for short).

Commercial N-P fertilizers are usually composed of ammonium phosphate and urea. The urea component is, as a rule, contaminated with biuret produced by the thermal decomposition of urea at some stage of the manufacturing process, which is highly undesirable since biuret is phytotoxic even at low concentrations. In a general way, urea is increasingly used as a fertilizer and would be used to a much larger extent if it were not so contaminated, since of all solid nitrogen fertilizers urea has the highest nitrogen content.

The most desirable modern way of using a fertilizer is the prilled state in which the fertilizer is easiest to handle and has a uniform particle size and a smooth surface owing to which caking and hygroscopicity are virtually eliminated. The flaked state is also acceptable. Prilling as well as flaking requires melting, and when this is done with urea it is in the course of this operation that biuret is formed.

This invention is based on the surprising discovery that urea can be melted and prilled or flaked under substantially anhydrous conditions practically without decomposition, if the melt contains phosphoric acid.

Prilled and flaked N-P fertilizers in which urea is the only or main source of nitrogen have not been known hitherto.

The invention, therefore, consists in a prilled or flaked fertilizer comprising urea and phosphoric acid at a weight ratio N:$P_2O_5$ not, or substantially not, larger than 3:1. The weight ratio N:$P_2O_5$=3:1 corresponds to a molar ratio urea: $H_2PO_4$=7.5:1. For the purposes of the present invention a urea: $H_3PO_4$ ratio of 8:1 can be regarded as a practical lower limit of the phosphoric acid content of the fertilizer, though the precise minimum of phosphoric acid will have to be determined under operating conditions of particular cases. The minimum of phosphoric acid will also depend on the required purity of the product. If the product contains less $H_3PO_4$ than corresponds to the urea: $H_3PO_4$ ratio of 8:1, some formation of biuret can be observed and at a ratio of 9:1 the product will already contain about 0.25% by weight of biuret. This, being still better than a conventional urea fertilizer, may possibly be tolerated in some cases and is, therefore, still deemed to be within the scope of this invention. However, where complete absence of biuret is preferred, the minimum of $H_3PO_4$ should correspond to a urea: $H_3PO_4$ ratio of 8:1 or, still better, 7.5:1.

For the purpose of this invention there is a practical upper limit for the proportion of phosphoric acid in the fertilizer, which corresponds to the formula $NH_2CONH_2 \cdot H_3PO_4$, with an N:$P_2O_5$ ratio of roughly 17:45, for this is the lowest proportion of nitrogen at which the composition can be obtained in solid form. Mixtures containing free $H_3PO_4$ above the proportion aforesaid do not have the desired physical properties. As a rule, the appropriate proportion of phosphoric acid will be determined by commercial or agronomic considerations. The N:$P_2O_5$ ratio of 3:1 is one of the desired commercial ratios. Other desired N:$P_2O_5$ ratios are 2:1 and 1:1 (corresponding to urea: $H_3PO_4$ molar ratios of, respectively 5:1 and 2.5:1). Of course, the N-P fertilizers of this invention may have any other proportions of nitrogen and $P_2O_5$.

The invention also provides a process for the manufacture of the new N-P fertilizers aforesaid, wherein a melt of urea phosphate, $CO(NH_2)_2H_3PO_4$, is prilled.

By another process according to the invention the phosphoric acid component may be admixed to the urea as free phosphoric acid. If, for this purpose, commercial concentrated phosphoric acid is used which still contains from 15 to 15 percent or even more of water, the water will have to be evaporated in vacuo. This can be done before or after the phosphoric acid has been admixed to the urea.

The present invention provides for the first time a fertilizer in which the nitrogen component consists initially of urea only, and wherein the urea is either free from biuret or contains only a controlled small amount of biuret.

The suppression of the formation of biuret according to the invention is all the more surprising since the mechanism of the biuret formation would seem to suggest that the presence of an acid capable of binding ammonia would rather tend to enhance the formation of biuret. Biuret is produced by a reaction according to the following scheme:

$$2NH_2CONH_2 \rightarrow NH_2CONHCONH_2 + NH_3$$

That is: 2 molecules of urea combined into one molecule of biuret while 1 molecule of ammonia is liberated. From the law of mass action it should be deduced that the more ammonia is bound, the more ammonia is developed, but in fact that does not happen.

The research work on which the present invention is based shows that the formation of biuret at the melting temperature of the mixture of urea and phosphoric acid is the smaller, the larger the proportion of phosphoric acid in the mixture, and that virtually no biuret is formed if the mixture contains one molar part or more of $H_3PO_4$ for each 7.5 parts of urea.

In order to achieve optimum results and to ensure rapid solidification of the drops in the prilling operation, it is important to carry out the melting at as low a temperature as possible. As the fertilizer compositions, beside containing urea phosphate, are essentially mixtures, their melting point is not sharp and the temperature of choice is the lowest one which gives sufficient fluidity to allow pouring.

Solidification of the drops can be accomplished by dropping the melt from a height sufficient to permit cooling, as in the prilling-tower technique with or without a counter-current of air, or by using a liquid as a heat transfer medium as in the oil-prilling technique.

The invention is illustrated by the following examples, to which it is not limited.

EXAMPLE I 15.8 g. (0.1 mole) of urea phosphate was mixed with 9 g. (0.15 mole) of urea and the mixture was heated with stirring in an oil bath kept at a temperature of 80 to 86° C. until it melts. In order to imitate prilling conditions on a laboratory scale the melt was dropped from a pipette and the drops were allowed to fall freely over a distance sufficiently great to allow them to cool and solidify on the way.

The product was found to be free of biuret. It had a weight ratio $N:P_2O_5$ of 1:1.

EXAMPLE 2

158 g. of urea phosphate and 240 g. of urea were mixed and the mixture was heated with stirring in an oil bath kept at a temperature of 85–90° C. until the mass became fluid. It was then poured into a prilling cup and the well-formed prills were collected in an oil recipient kept at room temperature. The product was strained and centrifuged to remove adhering oil. The product was found to be free of biuret and had a weight ratio $N:P_2O_5$ of 2:1.

The table below indicates the results of parallel experiments made with different urea $H_3PO_4$ ratios. It shows that in all mixtures in which the urea content did not exceed 7.5 molar parts for each part of $H_3PO_4$, the product was free from biuret, while already with 9 parts of urea for one part of $H_3PO_4$ there was a noticeable formation of biuret.

The table also shows the results of a "zero" test performed with urea without $H_3PO_4$, in which case the "prilled" product contained 0.45% of biuret.

TABLE

| No. | Urea, grams | Phosphate, mole | Urea Grams | Urea Mole | Urea/$H_3PO_4$ mole | Melting temperature, ° C. | Product Biuret, percent | Product $N:P_2O_5$, weight ratio |
|---|---|---|---|---|---|---|---|---|
| 1 | 15.8 | 0.1 | 9.0 | 0.15 | 2.5:1 | 80–85 | 0.0 | 1:1 |
| 2 | 15.8 | 0.1 | 15.0 | 0.25 | 3.5:1 | 77–80 | 0.0 | 1.4:1 |
| 3 | 15.8 | 0.1 | 21.0 | 0.35 | 4.5:1 | 80–84 | 0.0 | 1.8:1 |
| 4 | 15.8 | 0.1 | 24.0 | 0.40 | 5:1 | 85–87 | 0.0 | 2:1 |
| 5 | 15.8 | 0.1 | 36.0 | 0.60 | 7:1 | 92–94 | 0.0 | 2.7:1 |
| 6 | 15.6 | 0.1 | 39.0 | 0.65 | 7.5:1 | 95–105 | 0.0 | 3:1 |
| 7 | 15.8 | 0.1 | 48.0 | 0.80 | 9:1 | 100–115 | 0.25 | 3.6:1 |
| 8 | 15.8 | 0.1 | 60.0 | 1.0 | 11:1 | 105–120 | 0.5 | 4.4:1 |
| 9 | 15.8 | 0.1 | 84.0 | 1.4 | 15:1 | 113–120 | 0.6 | 6:1 |
| 10 | | | | | | 131–132 | 0.45 | |

This invention is also applicable to flaked fertilizers in connection with which the same difficulties regarding the formation of biuret in the melted urea arise. Though the prilled form of fertilizers is as a rule preferred to the flaked state, yet flaked fertilizers are still an important commercial commodity, the more so since small factories cannot always afford a prilling plant but are more readily in a position to effect flaking. It has been found that flaked urea-phosphoric acid fertilizers according to the invention are similarly free from biuret, or have a reduced biuret content, as are the prilled fertilizers.

We claim:
1. Prilled or flaked nitrogen-phosphate fertilizer consisting essentially of urea and phosphoric acid at a weight ratio $N:P_2O_5$ not larger than 3:1, and containing no greater than 0.25% by weight biuret.

2. Fertilizers according to claim 1, comprising urea and phosphoric acid at one of the commercially usual weight ratios $N:P_2O_5$ of about 2:1 or 1:1.

3. Nitrogen-phosphate fertilizer composition consisting essentially of
urea as substantially the sole source of nitrogen and phosphoric acid, the urea: $H_2PO_4$ molar ratio being not greater than 8:1 and the $N:P_2O_5$ weight ratio being from 17:45 to 3:1, said composition being substantially free of biuret and in the form of prills or flakes from a substantially anhydrous melt.

4. A process for the manufacture of a nitrogen-phosphate fertilizer composition consisting essentially of urea as substantially the sole source of nitrogen, comprising mixing urea and phosphoric acid at an urea: $H_3PO_4$ molar ratio not greater than 8:1, heating the mixture until the mass becomes fluid, prilling the mass and solidifying the prills by cooling.

References Cited

UNITED STATES PATENTS

| 1,951,518 | 3/1934 | Meiser et al. | 71—64 DB X |
| 3,022,153 | 2/1962 | Miller | 71—1 X |
| 2,663,731 | 12/1953 | Michelitsch | 71—64 DB X |
| 2,916,516 | 12/1959 | Michelitsch | 71—29 UX |
| 3,369,885 | 2/1968 | Takahashi et al. | 71—29 |

JOHN ADEE, Primary Examiner

U.S. Cl. X.R.

71—64 DB